United States Patent Office 3,389,160
Patented June 18, 1968

3,389,160
DIALKYLAMINO HYDROXY ORGANOSILICON COMPOUNDS AND DERIVATIVES THEREOF
Wallace G. Reid, Grand Island, N.Y., assignor to Union Carbide Corporation, a corporation of New York
No Drawing. Continuation-in-part of application Ser. No. 382,666, July 14, 1964. This application July 8, 1966, Ser. No. 563,694
13 Claims. (Cl. 260—448.2)

ABSTRACT OF THE DISCLOSURE

Organosilicon compounds having the generic formula:

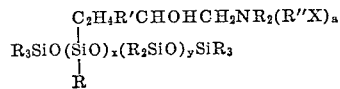

wherein R is a monovalent hydrocarbon group having up to about 18 carbon atoms; R' is a divalent hydrocarbon radical having up to 18 carbon atoms or a divalent hydrocarbonoxy radical having up to 18 carbon atoms wherein the oxygen in said hydrocarbonoxy radical is present in the form of ether linkages; X is an acid anion; R'' is either hydrogen or a group represented by R as hereinbefore defined; $a$ is 0 or 1; $x$ has an average value of from 1 to about 100; $y$ has an average value of from 0 to about 1000; and the ratio of $y$ to $x$ is no greater than about 50 to 1.

---

This application is a continuation-in-part of my application Ser. No. 382,666, filed July 14, 1964 and now abandoned.

This invention relates to novel dialkylamino hydroxy organosilicon compounds and certain derivatives thereof, such as their acid salts and their quarternary ammonium halide salts.

The novel silicon compounds which constitute the present invention are represented by the generic structural formula:

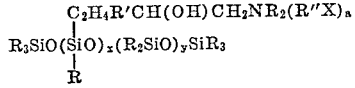

where:

(1) R is a monovalent hydrocarbon group having up to 18 carbon atoms,
(2) R' is a divalent hydrocarbon radical having up to 18 carbon atoms or a divalent hydrocarbonoxy radical having up to 18 carbon atoms wherein the oxygen in said hydrocarbonoxy radical is present in the form of ether linkages,
(3) X is an acid anion,
(4) R'' is hydrogen, or, when X is an anion of a halogen acid, R'' is ether hydrogen or a group represented by R as hereinbefore defined,
(5) $a$ is 0 or 1,
(6) $x$ has an average value of from 1 to about 100, and preferably has an average value of from 1 to about 50,
(7) $y$ has an average value of from 0 to about 1000, and preferably has an average value of from 0 to about 250, and
(8) the ratio of $y$ to $x$ is no greater than about 50 to 1, and preferably is no greater than about 20 to 1.

It should be noted that Formula I shows the organofunctional chain attached to the siloxane moiety through the —$C_2H_4$— group. This structural representation is intended to indicate that the Si atom may be attached either to the terminal or second C atom in the organofunctional chain.

It should also be observed that when $a$ is zero in Formula I, the dialkylamino hydroxy organosilicon compounds of Formula II below are obtained. When $a$ is 1 and R'' is hydrogen, the acid salt derivatives depicted by Formula III below are obtained. When $a$ is 1 and R'' is R, the quarternary ammonium halide derivatives shown by Formula IV below are obtained.

Suitable monovalent hydrocarbon groups represented by R in Formula I above include alkyl, alkenyl, aryl, alkaryl, or aralkyl groups. Illustrative monovalent hydrocarbon groups from which R can be selected are: methyl, ethyl, propyl, isobutyl, decyl, octadecyl, cyclopentyl, cyclohexyl, naphthyl, vinyl, butenyl, cyclohexenyl, tolyl, xylyl, benzyl and betaphenylethyl. Preferably R is methyl.

Suitable divalent hydrocarbon radicals represented by R' in Formula I above are the alkylene, arylene or aralkylene radicals; suitable divalent hydrocarbonoxy radicals represented by R' are the same as the hydrocarbon radicals except that they also contain one or more ether linkages (i.e. —$CH_2$—O—$CH_2$—). Thus, R' can be an alkylene group such as methylene, ethylene, propylene or butylene; it can be an arylene group such as phenylene; it can be an aralkylene group such as phenyl methylene or it can be any of these groups having one or more ether linkages therein (i.e. a hydrocarbonoxy group).

The novel dialkylamino hydroxy organosilicon compounds of this invention, which are useful as corrosion inhibitors for aqueous systems, are represented by the structural formula:

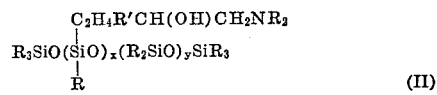

where R, R', $x$, $y$ and the ratio of $y$ to $x$ are the same as defined for Formula I above.

The novel acid salt derivatives of this invention, which are useful as surfactants or surface tension depressants for aqueous systems, are represented by the formula:

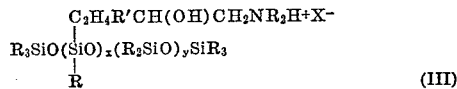

where R, R', X, $x$, $y$ and the ratio of $y$ to $x$ are the same as defined for Formula I above.

The novel quarternary ammonium derivatives of this invention, which are useful as surfactants or surface tension depressants for aqueous systems, are represented by the formula:

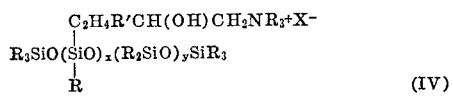

where X is a halogen atom and R, R', $x$, $y$ and the ratio of $y$ to $x$ are the same as defined for Formula I above.

The dialkylamino hydroxy organosilicon compounds of this invention are preferably prepared by a two-step process. The first step in the process consists of reacting a hydrosilicon compound (i.e. a silane or siloxane containing silicon bonded hydrogen, and which may be represented as ≡SiH) with an olefinc epoxide in the presence of a platinum or other addition catalyst to give an epoxy silicon compound. The second step consists of reacting the product of the first step, namely, the epoxy silicon compound with a secondary amine. This reaction results in splitting of the epoxy (oxirane) ring, and yields the novel dialkylamino hydroxy silicon compound represented by Formula II. In order to prepare the novel acid salt derivatives thereof, shown by Formula III, the product of the second step is reacted with HX wherein X is as hereinbefore defined. If, on the other hand, the quaternary ammonium derivatives represented by Formula IV are sought, then the product of the second step is reacted with an organo-halide.

The above-described processes can be illustrated by the following simplified or skeletal equations which emphasize the reactive moieties involved in the invention:

First step:

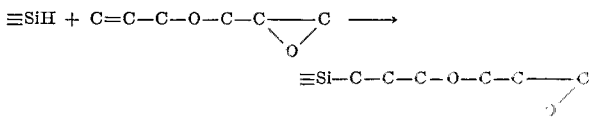

Second step:

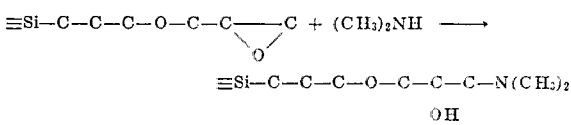

Third step (A):

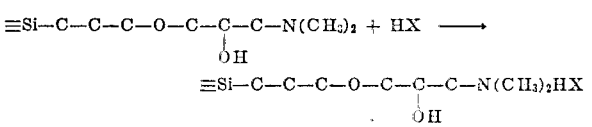

or

Third step (B) (in this instance X represents halogen only):

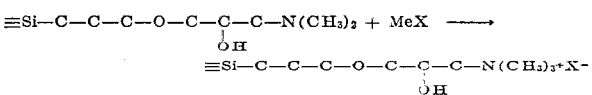

While substantially any hydrosilicon compound will react with a compound containing olefinic unsaturation, the hydrosilicon compounds which have been found most useful in the present invention have the formula:

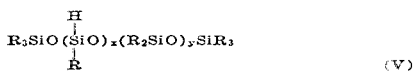

wherein R, $x$, $y$ and the ratio of $y$ to $x$ as defined with respect to Formula I above. It will be apparent to those skilled in the art that the repeating siloxane units may be varied from those shown in the preferred embodiment of Formula V above, and that equivalent repeating siloxane units may be substituted for those shown. For example, trifunctional repeating units such as $RSiO_{1.5}$ may be used, to replace some or all of the $R_2SiO$ units, and to replace some of the HRSiO units without departing from the basic concepts of this invention. The particular methods for preparing such polysiloxanes are well known in the art.

The olefinic expoxides which are useful in the present invention are represented by the formula:

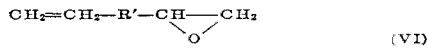

where R' is a divalent hydrocarbon radical or a divalent hydrocarbonoxy radical as defined for Formula I above.

Examples of specific compounds represented by Formula VI which are useful in this invention include butadiene monoepoxide, allyl glycidyl ether, limonene monoepoxide, vinylcyclohexene monoepoxide, 2-allyl phenyl glycidyl ether, p-diallylphenyl monoepoxide cyclooctodiene monoepoxide, dipentene monoepoxide, and di-vinyltriethylene glycol monoepoxide. Allyl glycidyl ether is the preferred compound.

In order to prepare the dialkylamino hydroxyorganosilicon compounds of Formula II which are uniquely suited for the preparation of the quaternary ammonium surfactants of Formula IV, it is essential that a secondary amine be used. One active hydrogen on the nitrogen atom is needed to split the epoxy group in a manner which will yield a hydroxyl containing amine. The presence of a greater number of active hydrogen atoms, as in primary amines is undesirable since they would tend to cause polymerization by linking two or more epoxy silicone compounds together. Such material would be unsuitable for the preparation of surfactants.

The secondary amines which are useful in this invention have the formula, $R_2NH$ where R is a monovalent hydrocarbon having the same meaning as R in Formula I above. Suitable secondary amines include dimethylamine, methylethyl amine, diethylamine, methylphenyl amine, diphenyl amine, cyclohexylamine, methylbenzylamine, dioctylamine, phenyl benzylamine, and the like. Dimethylamine is the preferred secondary amine.

The acids which are useful in the preparation of the acid salts of this invention have the formula HX where X is an acid anion, such as a halide anion, a carboxylate anion, a phosphate anion, a sulfate anion, and the like. Thus, in addition to acids such as hydrochloric acid, hydrobromic acid, and hydroiodic acid, other mineral acids such as phosphoric acid, sulfuric acid, and the like may be employed; as well as carboxylic acids, such as formic acid, acidic acid, benzoic acids. The halogen acids and carboxylic acids containing from 1 to about 6 carbon atoms are preferred reactants, and hydrochloric acid and acetic acid are particularly preferred.

The organic halides which are useful in the preparation of the quaternary ammonium salts of this invention have the formula RX where X is a halogen, (bromine, chlorine, fluorine or iodine) and R is a monovalent hydrocarbon having the same meaning as R in Formula I above. Suitable organic halides include methyl chloride, ethyl chloride, allyl chloride, methyl bromide, methyl iodide, isopropyl bromide, ethyl bromide, propyl iodide, benzyl chloride, benzyl bromide, 2-phenylethyl chloride, etc. Methyl chloride is preferred.

Catalysts useful in the first step of the reaction, viz. the addition of the hydrosilicon compound to the double bond of the olefinic epoxide, are well known in the art, and include various forms of platinum, for example, platinum supported on carbon or aluminum, platinum black, platinic chloride, potassium chloroplatinate, and the most preferred form, chloroplatinic acid. To facilitate handling the relatively small quantities of catalyst required, it is convenient to employ a solution of the catalyst in an organic solvent. Useful solvents include alcohols such as ethanol, ethylene glycol or isopropanol; methyl and ethyl ethers, dioxane, tetrahydrofurane, and mixtures of these.

The addition of the SiH compound to the olefinic epoxide map be carried out in aromatic solvents such as benzene or toluene. If the reactants are mutually soluble, however, no solvent is needed. The reaction time for this step depends on a number of variables such as the nature and relative proportion of the specific reactants, type and concentration of catalyst, temperature, pressure and solvent. The temperature of the addition reaction can be from below 25° C. to 200° C., the preferred range being 50–150° C. Atmospheric pressure is used unless low boiling solvents or reactants are used. In all the steps of the present process, stoichiometric amounts of reactants can be used; however, it is sometimes advantageous to use an excess of one reactant or another in order to increase the yield or the reaction rate.

No catalyst is needed for the second step of the reaction, i.e. the addition of the secondary amine to the epoxide group, since the reaction will proceed by itself. A solvent is preferably used. Alcohols such as methanol, ethanol or isopropanol are suitable. This step may be carried out at atmospheric or under positive pressure, at temperatures from below 25° C. to about 150° C.; preferably in the range of 50–150° C.

The preparation of the acid salt requires no catalyst and may be carried out at room temperature by merely reacting an dialkylamino compound of Formula II with an acid represented by the formula HX (wherein X is as hereinbefore defined) to form the acid salt.

The quaternization step requires no catalyst and is conveniently carried out in the same solvent as that used in the second step. Thus, the reaction product of the second step need not be separated from the alcoholic solvent prior to the addition of the organo-halide. The quaternization may be carried out at atmospheric pressure or under positive pressure, and at a temperature ranging from below 25° C. to 150° C.; the preferred range being 60–125° C.

The novel organosilicon surfactants of this invention (i.e. the acid or quaternary ammonium salts) are particularly useful as de-icers for aluminum surfaces, and in addition are useful for rendering the surface of glass and kaolin hydrophobic.

The following examples are given by way of illustration only in order to describe the invention in greater detail, and are not intended to limit the scope thereof.

Example I

Preparation of 
$$\text{C}_2\text{H}_4\text{CH}_2\text{O CH}_2\text{CH(OH)CH}_2\text{N(CH}_3)_2$$
$$(\text{CH}_3)_3\text{SiOSiOSi(CH}_3)_3$$
$$|$$
$$\text{CH}_3$$

Into a 200 ml. distillation flask were placed:
66.8 grams (.300 mole) of heptamethyltrisiloxane, $$(\text{CH}_3)_3\text{SiO}\overset{\text{H}}{\underset{\text{CH}_3}{\text{Si}}}\text{OSi(CH}_3)_3$$

33.7 grams (.330 mole) of allyl glycidyl ether, $$\text{CH}_2\text{=CHCH}_2\text{OCH}_2\text{CH}\overset{\diagdown}{\underset{\text{O}}{\diagup}}\text{CH}_2$$

and 3 drops of an ethanolic solution of $\text{H}_2\text{PtCl}_6 \cdot 6\text{H}_2\text{O}$ ($9 \times 10^{-6}$ moles $\text{H}_2\text{PtCl}_6$). The flask was attached to a distillation apparatus equipped with a Dry Ice-acetone cold trap. The reaction mixture was heated slightly and the reaction which is exothermic rose, and was maintained at 110° C. for four hours. Thereafter, the product was distilled at .20 mm. Hg and 78° C. It yielded 57.4 grams of a liquid which was analyzed as being $$\text{C}_2\text{H}_4\text{CH}_2\text{OCH}_2\text{CH}\overset{\diagup\text{O}\diagdown}{\phantom{xx}}\text{CH}_2$$
$$(\text{CH}_3)_3\text{SiOSiOSi(CH}_3)_3$$
$$|$$
$$\text{CH}_3$$

34.6 grams (.102 moles) of this epoxy silicon compound were then placed in a 200 ml. flask along with 50.0 grams of ethanol. The flask was attached to a condenser cooled with a mixture of Dry Ice and acetone. The contents of the flask were then heated to 70° C. and gaseous dimethylamine, $(\text{CH}_3)_2\text{NH}$ was added slowly over a two hour period at a rate which maintained a reflux. Thereafter, excess ethanol and $(\text{CH}_3)_2\text{NH}$ were stripped from the product at 40° C. and 0.3 mm. Hg. The remaining product was 39.3 grams of a dialkylaminohydroxy silicone compound having the structural formula:

$$\text{C}_2\text{H}_4\text{CH}_2\text{O CH}_2\text{CH(OH)CH}_2\text{N(CH}_3)_2$$
$$(\text{CH}_3)_3\text{SiOSiOSi(CH}_3)_3$$
$$|$$
$$\text{CH}_3$$

This compound is uniquely suited as an intermediate for the preparation of highly active cationic surfactants, and may be used as a corrosion inhibitor for aqueous systems.

Example II

Preparation of 
$$\text{C}_2\text{H}_4\text{CH}_2\text{O CH}_2\text{CH(OH)CH}_2\text{N(CH}_3)_3{}^+\text{Cl}^-$$
$$(\text{CH}_3)_3\text{SiOSiOSi(CH}_3)_3$$
$$|$$
$$\text{CH}_3$$

The above compound, which is the quaternary ammonium derivative of the dialkylamino-hydroxy siloxane of Example I was prepared by taking 35.3 grams (0.926) of the product of Example I and placing it in a 200 ml. flask, along with 42 grams of ethanol. The flask was connected to a Dry Ice-acetone cooled reflux condenser, heated to 70° C. and then gaseous methyl chloride, $\text{CH}_3\text{Cl}$ was added until reflux began. Reflux was maintained by slow addition of methyl chloride for two hours during which time the temperature was maintained at 60–70° C. Thereafter, the ethanol solvent and excess methyl chloride were stripped by vacuum distillation at 40° C. and 0.3 mm. Hg pressure. 40 grams of a viscous liquid remained which was determined to be $$\text{C}_2\text{H}_4\text{CH}_2\text{O CH}_2\text{CH(OH) CH}_2\text{N(CH}_3)_3{}^+\text{Cl}^-$$
$$(\text{CH}_3)_3\text{SiOSiOSi(CH}_3)_3$$
$$|$$
$$\text{CH}_3$$

The surface activity of this product was determined by adding small quantities of it to water and measuring the decrease in surface tension. The results are shown in Table I below.

Example III

Preparation of 
$$\text{C}_2\text{H}_4\text{CH}_2\text{O CH}_2\text{CH(OH)CH}_2\text{N(CH}_3)_2\text{H}^+\text{Cl}^-$$
$$(\text{CH}_3)_3\text{SiOSiOSi(CH}_3)_3$$
$$|$$
$$\text{CH}_3$$

The above compound, which is the hydrochloride of the dialkylaminohydroxy siloxane of Example I was prepared by adding an equivalent amount, viz. 26 ml. of 0.1 N HCl to 1 gram of the product of Example I at room temperature while stirring the mixture. Thereafter, 73 grams of water were added to make the solution a 1% solution of the hydrochloride in water. The surface tension of this solution and of a 0.1% and 0.01% solution were then measured to determine its surface active characteristics. These are shown in Table I below. The product of this example may be isolated in pure form by evaporation of the solvent.

It is, of course, well known that it is characteristic of surfactants that they are able to lower appreciably the surface tension of a liquid even when used in low concentration. For purposes of comparison, equal quantities of conventional organic surfactants and the surfactants of this invention were added to water and the resulting decrease in surface tension measured. The results are tabulated below. All percentages are by weight.

TABLE I

| Surfactant | Surface Tension (dynes/cm.) | | |
|---|---|---|---|
| | 0.01% | 0.1% | 1% |
| Example II | 21.9 | 20.8 | 20.1 |
| Example III | 23.0 | 21.8 | 21.4 |
| Aliquot 204 [1] | 29 | 27 | 26 |
| Aliquot 4 [2] | 49 | 40 | 36 |
| Aerosol OT [3] | 43.4 | 29.2 | 26.2 |
| Triton X-100 [4] | 31.1 | 30.4 | 30.0 |

[1] Dilauryl dimethylammonium chloride.
[2] Lauryl trimethylammonium chloride.
[3] Dioctyl sodium sulfosuccinate.
[4] The reaction product of octylphenol and polyethylene oxide.

The comparative data given in Table I demonstrates clearly that the surfactants of this invention are better surface tension depressants than some of the most powerful surfactants commercially available. It can be seen that none of the conventional surfactants even at 1% concentration are able to depress the surface tension of water below 26 dynes/cm. However, the surfactants of Example I and Example II are able to go considerably below that figure even at concentrations as low as 0.01%. At 1% concentration the quaternary ammonium surfactant of Example I can depress the surface tension of water almost to 20 dynes/cm. This fact makes it an unexpectedly superior surfactant. The surface tension of pure water is 72.0 dynes/cm.

Example IV

Preparation of

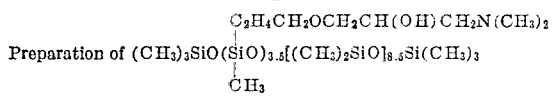

To a 500 ml. three-necked flask equipped with a Dry Ice condenser and trap were added 570 grams of an epoxy modified silicone having the average composition

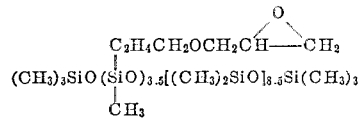

and 570 grams of ethanol. After heating the solution to 80° C., 77 grams of gaseous dimethylamine were added over a period of two hours during which time the temperature was maintained between 75° C. and 80° C. The product was an ethanolic solution of a dialkylaminohydroxy silicone compound having the average formula:

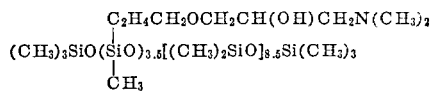

The above compound may be isolated by distilling away the ethanol. It is useful as an intermediate in the preparation of surfactants.

Example V

Preparation of

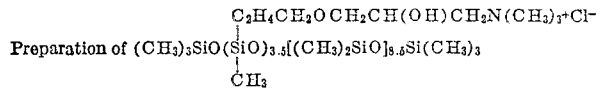

In order to prepare the quaternary ammonium derivative of Example IV, 102 gm. of gaseous MeCl were added to 1214 grams of the ethanolic solution obtained in Example IV. The reaction took 2½ hours at a temperature of 50–80° C. The solution was sparged with nitrogen for several minutes, cooled and filtered. The product analyzed as

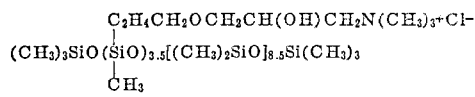

A 1% solution of this material depressed the surface tension of water to 26.0 dynes/cm.

Example VI

Preparation of

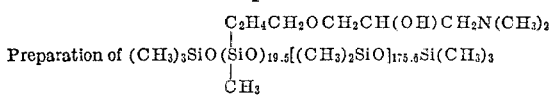

To a one liter three-necked flask equipped with a Dry Ice condenser and trap were added 193.1 grams of an epoxy-modified silicone having the average composition

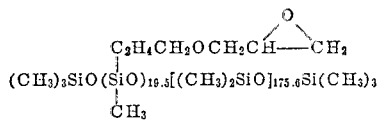

and 413 grams of ethanol. After heating the solution to 65° C., 13.4 grams of gaseous dimethylamine were added over a period of an hour. The reaction mixture was maintained at 65° C. for an additional 45 minutes, and sparged with nitrogen gas at a rate of 0.5 liter per minute. 200 ml. of ethanol were removed and the resultant product was an ethanolic solution of a dialkyl-aminohydroxy silicone compound having the average formula:

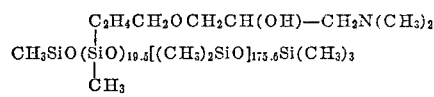

The above compound may be isolated by distilling off the remaining ethanol. It is useful as an intermediate in the preparation of surfactants.

Example VII

Preparation of

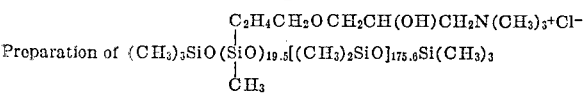

In order to prepare the quaternary ammonium derivative of the product of Example VI, 15.1 grams of methyl chloride were added to the ethanolic solution obtained in Example VI at 70° C. over a period of 1 hour. The reaction mixture was maintained at 70° C. for an additional hour and a half before adding more methyl chloride. Methyl chloride was bubbled through the reaction mixture at 70° C. for another hour to complete quaternization, then the solution was sparged with nitrogen. 66 ml. of ethanol were taken off to provide a reaction mixture with a solids concentration of approximately 50%, 0.2 gram of carbon black were added and the mixture was heated for an hour before filtering. After being filtered, resulting product analyzed as

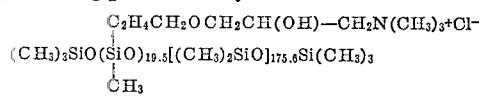

This product readily formed a dispersion in water and had a viscosity as measured by a Brookfield viscometer of 48.0 centipoise at 25° C. The product was acidified by adding 80 drops of concentrated hydrochloric acid.

Dispersions and emulsions of this product are useful as surfactants.

Example VIII

Preparation of

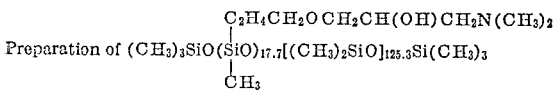

To a 500 ml. three-necked flask equipped with a thermometer, Dry Ice condenser and gas sparge tube were added 100 grams of an epoxy-modified silicone having the average composition

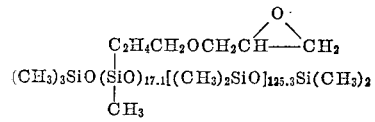

and an equal volume of absolute ethanol (89.1 grams). The mixture was then heated to 75° C. and stirred with a magnetic stirrer. A Dry Ice trap was used to condense out the necessary amount of dimethylamine (6.9 grams, a 10% excess) which was allowed to pass into the heated reaction mixture through the gas sparge tube. Upon completion of the addition of the dimethylamine the reaction mixture was sparged with nitrogen to remove any excess dimethylamine. The resultant product was an ethanolic solution of a dialkylaminohydroxy silicone compound having the average formula:

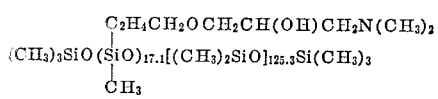

The above compound may be isolated by distilling off the ethanol. It is useful as an intermediate in the preparation of surfactants.

Example IX

Preparation of

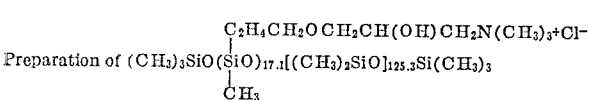

In order to prepare the quaternary ammonum derivative of the product of Example VIII, 8.6 grams (30% excess) of methyl chloride were slowly added to 106 grams of the ethanolic solution obtained in Example VIII at a temperature of from 75 to 80° C. Upon completion of the addition of the methyl chloride the reaction mixture was sparged briefly with nitrogen to remove any excess methyl chloride. The resulting product was an amber liquid containing 53.2% solids which analyzed as

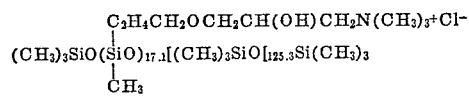

A 1% aqueous emulsion of this product was prepared, using 0.3% of "Tween 80" as an emulsifier. When this emulsion was applied to a wetted, clean glass slide, the "water breaking" phenomenon which is characteristic of a water displacing surfactant was observed. The glass slide not only became hydrophobic, but was resistant to several water rinses.

Example X

Preparation of 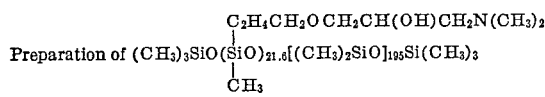

In a manner similar to that described in Example VIII, 155 grams of an epoxy-modified silicone having the average composition

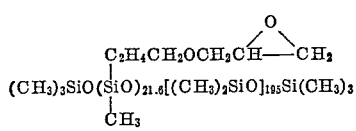

in an equal volume of absolute ethanol (142.4 grams) were reacted with 9 grams of dimethylamine (10% excess). Upon completion of the reaction, the resultant product was an ethanolic solution of a dialkylaminohydroxy silicone compound having the average formula:

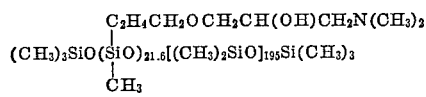

The above compound may be isolated by distilling of the ethanol solvent. It is useful as an intermediate in the preparation of surfactants.

Example XI

Preparation of 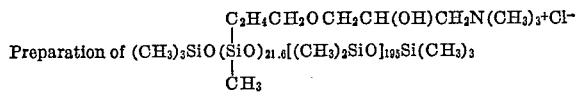

In a manner similar to that described in Example IX, 12 grams (30% excess) of methyl chloride were slowly added to 163 grams of the ethanolic solution obtained in Example X. Upon completion of the reaction the resulting product was an amber liquid containing 50% solids which analyzed as

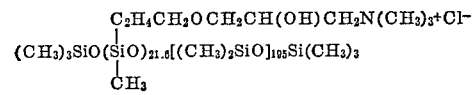

A 1% aqueous emulsion of this product was prepared using 0.3% of "Tween 80" as an emulsifier. When this emulsion was applied to a wetted, clean glass slide, the "water breaking" phenomenon which is characteristic of a water displacing surfactant was observed. The glass not only became hydrophobic, but was resistant to several water rinses.

Example XII

Preparation of

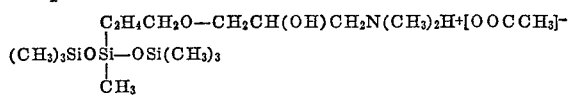

200 grams of an epoxy-modified silicone having the formula

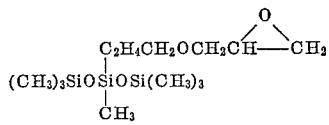

were dissolved in 500 ml. of absolute ethanol and heated to 70° C. A Dry Ice-acetone trap was used to condense out the necessary amount of dimethylamine (30 grams-10% excess) which was allowed to pass into the heated reaction mixture through a sparge tube. The amine was added over a one hour period. Since the reaction between the amine and the epoxy-modified silicone was exothermic, some cooling of the reaction mixture was necessary. Upon completion of the addition of the amine, the reaction mixture was maintained at 70° C. for an additional hour, after which 100 ml. of ethanol were sparged off with nitrogen to remove any excess amine. The resultant product was an ethanolic solution of a dialkylaminohydroxy silicone compound having the formula

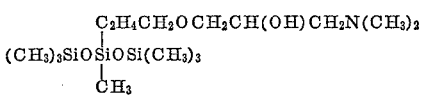

100 ml. of fresh ethanol were added and the solution was transferred to a 1 liter flask. An equimolar amount (34 cc.) of glacial acetic acid was added slowly from a dropping funnel to form the acid salt of the dialkylaminohydroxy silicone reactant, a salt having the formula

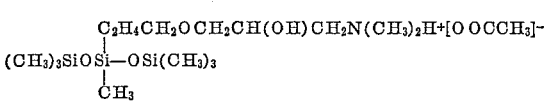

The resultant ethanolic solution of this product was a dark orange, sweet-smelling liquid surfactant which foamed well in water.

What is claimed is:

1. A composition of matter having the structural formula:

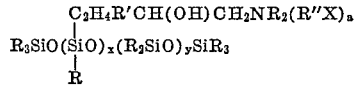

where:
(1) R is a monovalent hydrocarbon group having up to about 18 carbon atoms,
(2) R' is a divalent alkylene radical having up to 18 carbon atoms or a divalent hydrocarbonoxy radical having up to 18 carbon atoms wherein the oxygen in said hydrocarbonoxy radical is present in the form of ether linkages, and wherein the hydrocarbon portion of said hydrocarbonoxy radical is present in the form of divalent alkylene radicals,
(3) X is an acid anion,
(4) R'' is hydrogen, or, when X is an anion of a halogen acid, R'' is either hydrogen or a group represented by R as hereinbefore defined,
(5) $a$ is 0 or 1,
(6) $x$ has an average value of from 1 to about 100,
(7) $y$ has an average value of from 0 to about 1000, and
(8) the ratio of $y$ to $x$ is no greater than about 50 to 1.

2. A composition of matter as claimed in claim 1 wherein R is methyl, R' is a divalent hydrocarbonoxy radical having the formula —$CH_2OCH_2$—, $x$ has an average value of from 1 to about 50, $y$ has an average value of from 0 to about 250, and the ratio of $y$ to $x$ is no greater than about 20 to 1.

3. A composition of matter having the structural formula:

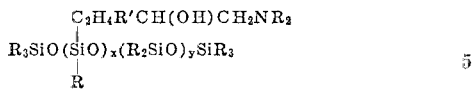

where:
(1) R is a monovalent hydrocarbon group having up to about 18 carbon atoms,
(2) R' is a divalent alkylene radical having up to about 18 carbon atoms or a divalent hydrocarbonoxy radical having up to 18 carbon atoms wherein the oxygen in said hydrocarbonoxy radical is present in the form of ether linkages, and wherein the hydrocarbon portion of said hydrocarbonoxy radical is present in the form of divalent alkylene radicals,
(3) $x$ has an average value of from 1 to about 50,
(4) $y$ has an average value of from 0 to about 250, and wherein
(5) the ratio of $y$ to $x$ is no greater than about 20 to 1.

4. A composition of matter having the structural formula:

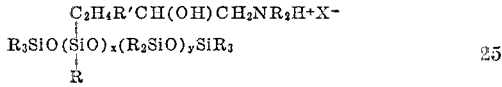

where:
(1) R is a monovalent hydrocarbon group having up to about 18 carbon atoms,
(2) R' is a divalent alkylene radical having up to about 18 carbon atoms or a divalent hydrocarbonoxy radical having up to about 18 carbon atoms wherein the oxygen in said hydrocarbonoxy radical is present in the form of ether linkages, and wherein the hydrocarbon portion of said hydrocarbonoxy radical is present in the form of divalent alkylene radicals,
(3) X is an acid anion
(4) $x$ has an average value of from 1 to about 50,
(5) $y$ has an average value of from 0 to about 250, and wherein
(6) the ratio of $y$ to $x$ is no greater than about 20 to 1.

5. A composition of matter having the structural formula:

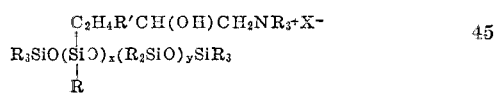

where:
(1) R is a monovalent hydrocarbon group having up to about 18 carbon atoms,
(2) R' is a divalent alkylene radical having up to about 18 carbon atoms or a divalent hydrocarbon radical having up to about 18 carbon atoms wherein the oxygen in said hydrocarbonoxy radical is present in the form of ether linkages, and wherein the hydrocarbon portion of said hydrocarbonoxy radical is present in the form of divalent alkylene radicals.
(3) X is a halide anion,
(4) $x$ has an average of from 1 to about 50,
(5) $y$ has an average value of from 0 to about 250, and wherein
(6) the ratio of $y$ to $x$ is no greater than about 20 to 1.

6. A composition of matter having the average general formula:

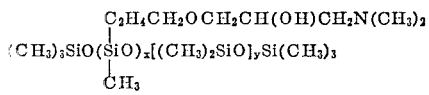

wherein $x$ has an average value of from 1 to about 50, $y$ has an average value of from 0 to about 250, and the ratio of $y$ to $x$ is no greater than about 20 to 1.

7. A composition of matter having the average general formula:

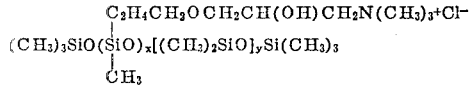

wherein $x$ has an average value of from 1 to about 50, $y$ has an average value of from 0 to about 250, and the ratio of $y$ to $x$ is no greater than about 20 to 1.

8. A composition of matter having the formula:

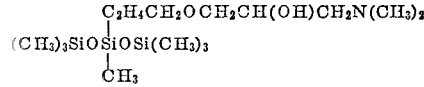

9. A composition of matter having the formula:

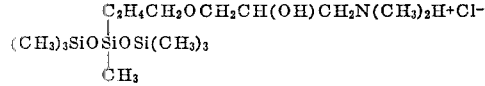

10. A composition of matter having the formula:

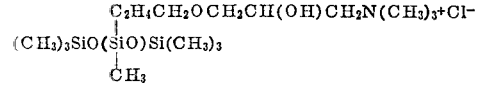

11. A composition of matter having the formula:

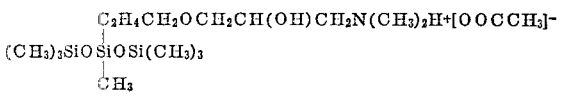

12. A composition of matter having the formula:

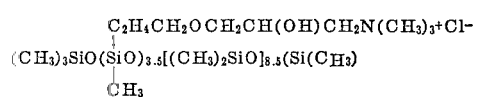

13. A composition of matter having the formula:

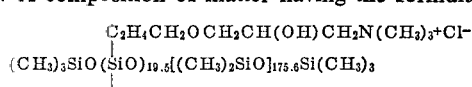

References Cited
UNITED STATES PATENTS

| | | | |
|---|---|---|---|
| 2,970,150 | 1/1961 | Bailey | 260—448.2 X |
| 2,972,598 | 2/1961 | Morehouse | 260—448.2 X |
| 3,032,577 | 5/1962 | Morehouse | 260—448.2 |
| 3,046,250 | 7/1962 | Plueddemann | 260—448.2 X |
| 3,152,161 | 10/1964 | Lisanke et al. | 260—448.2 X |

TOBIAS E. LEVOW, *Primary Examiner.*

P. F. SHAVER, *Assistant Examiner.*